United States Patent [19]

Brandt et al.

[11] Patent Number: 4,491,010
[45] Date of Patent: Jan. 1, 1985

[54] DYNAMIC COMBUSTION CHARACTERISTIC SENSOR FOR INTERNAL COMBUSTION ENGINE

[75] Inventors: Herman F. Brandt, Birmingham; Franklin R. Gibson, Romeo, both of Mich.

[73] Assignee: General Motors Corporation, Detroit, Mich.

[21] Appl. No.: 506,208

[22] Filed: Jun. 20, 1983

[51] Int. Cl.³ ............................................. G01L 23/22
[52] U.S. Cl. ............................................... 73/35; 73/714
[58] Field of Search ........................... 73/35, 714, 761

[56] References Cited

U.S. PATENT DOCUMENTS

| | | | |
|---|---|---|---|
| 3,541,844 | 11/1970 | Stover | 73/761 |
| 3,561,260 | 2/1971 | Reynolds | 73/761 |
| 3,823,639 | 7/1974 | Liber | 73/761 X |
| 3,886,840 | 6/1975 | Bossler | 73/761 |
| 3,948,141 | 4/1976 | Shinjo | 73/761 X |
| 3,964,299 | 6/1976 | Johnson | 73/761 |
| 3,969,713 | 7/1976 | Bossler | 73/761 |
| 3,987,668 | 10/1976 | Popenoe | 73/761 |
| 4,062,227 | 12/1977 | Heyman | 73/630 |
| 4,153,019 | 5/1979 | Laubenstein et al. | |
| 4,169,388 | 10/1979 | Teitlebaum et al. | 73/714 |
| 4,254,354 | 3/1981 | Keem | 73/35 X |
| 4,266,427 | 5/1981 | Wesley | 73/119 A |
| 4,393,688 | 7/1983 | Johnston et al. | 73/35 |
| 4,446,722 | 5/1984 | Borushewitz et al. | 73/35 |

Primary Examiner—James J. Gill
Attorney, Agent, or Firm—Robert M. Sigler

[57] ABSTRACT

A dynamic combustion characteristic sensor suitable for the detection of the timing of peak combustion pressure or the occurrence of knock in an internal combustion engine comprises an engine headbolt having a piezoelectric disc affixed to the surface of the bolt head. An insulator holds an inner terminal electrically connected to the upper side of the piezoelectric disc and is held by its lower periphery, along with a surrounding electrically conducting outer terminal by a vertical annular wall rising from the surface of the bolt head. The annular wall and outer terminal provide electrostatic shielding and a ground reference for the inner terminal, which is connected electrically by a shielded connector to a charge amplifier with a double pole high pass filter with a half power frequency of 0.5–1.0 Hertz to block signals generated by thermal strains in the engine.

4 Claims, 4 Drawing Figures

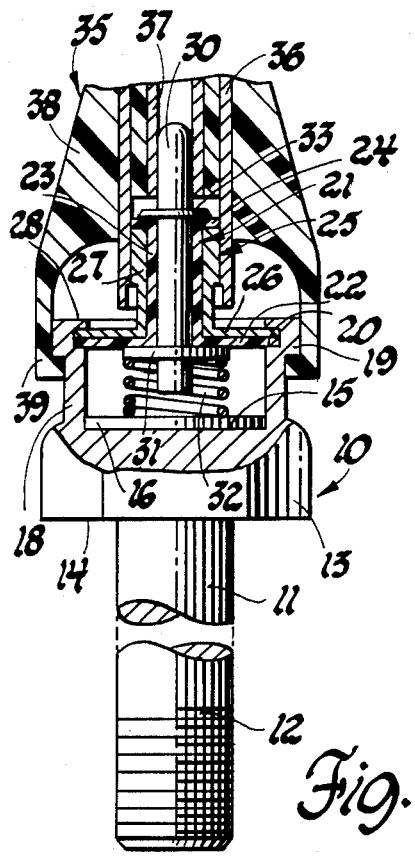
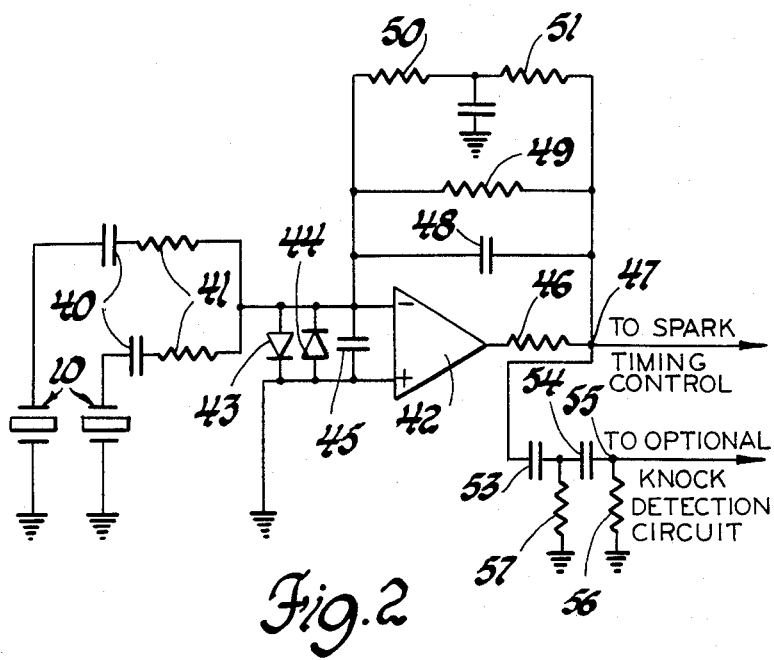
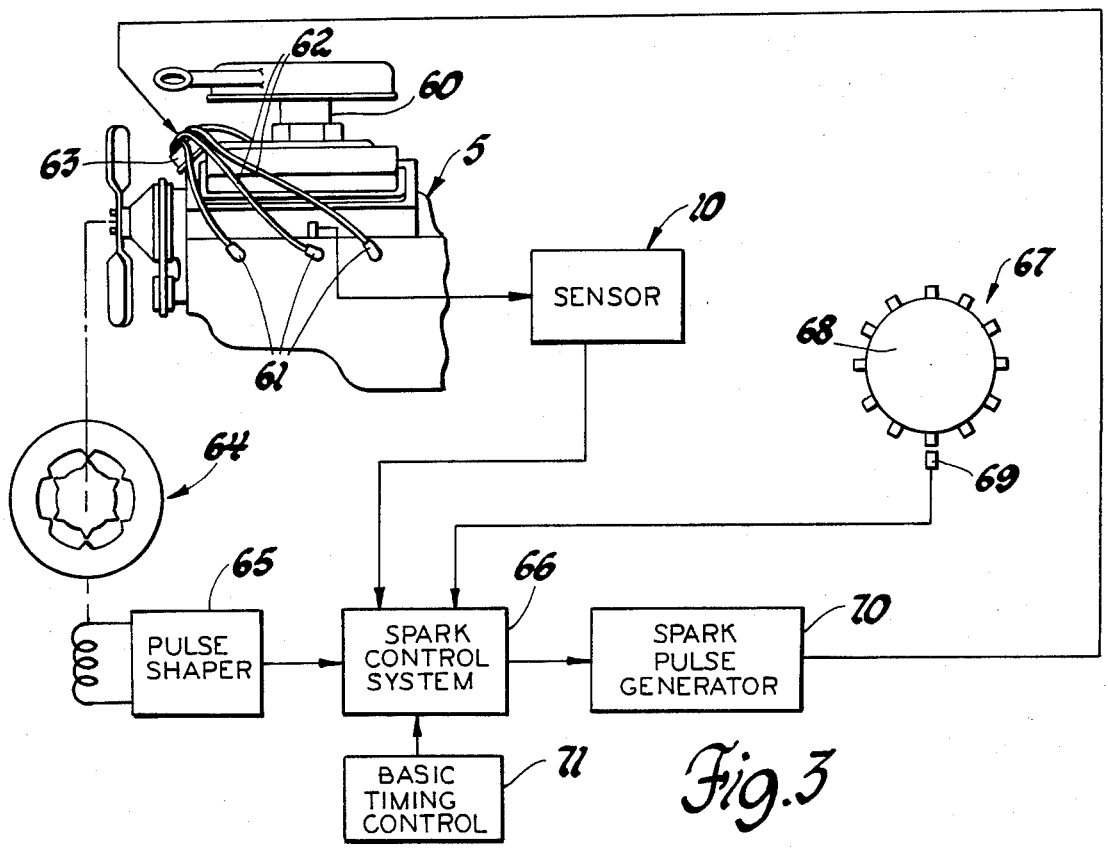
Fig.1
Fig.2
Fig.3

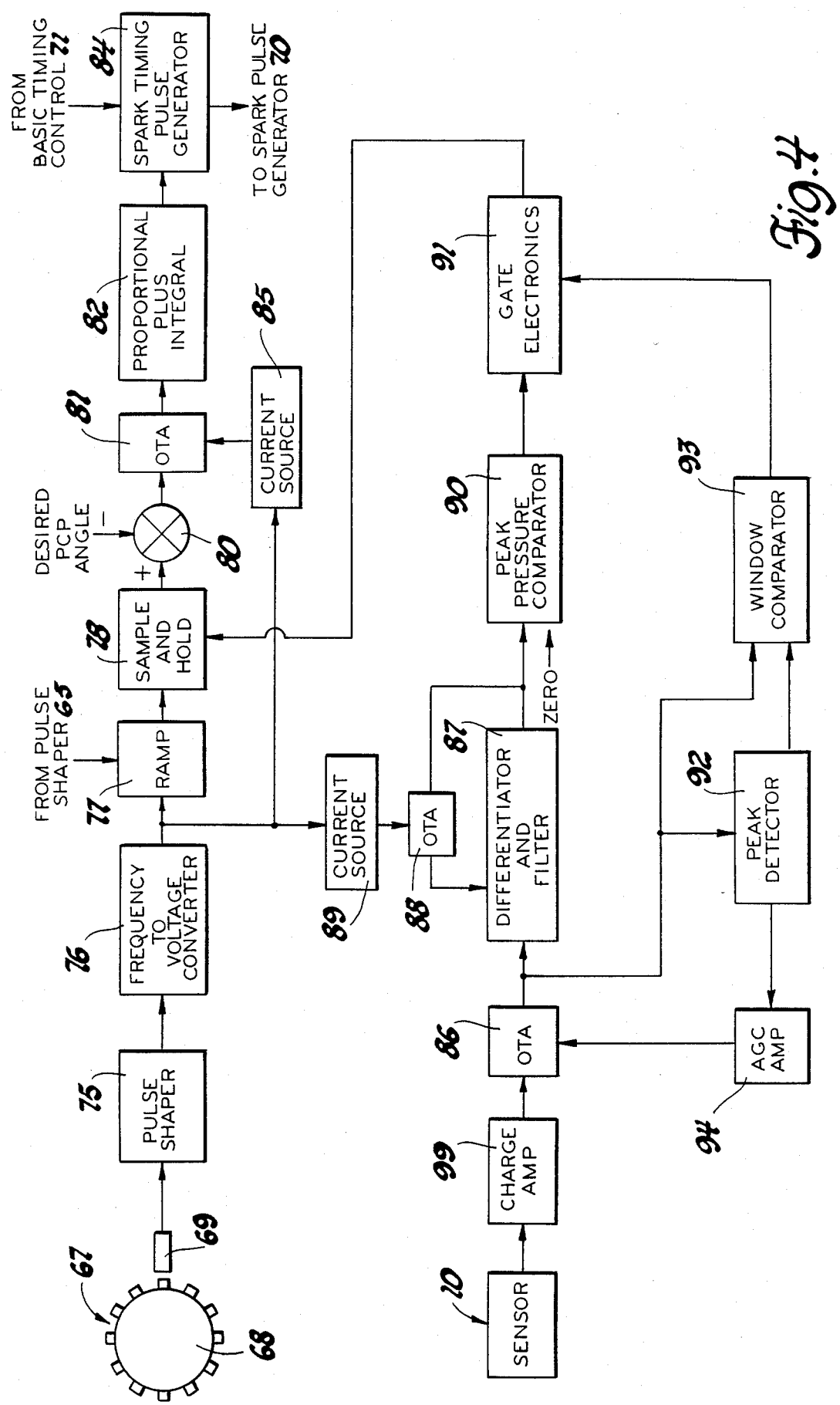

DYNAMIC COMBUSTION CHARACTERISTIC SENSOR FOR INTERNAL COMBUSTION ENGINE

BACKGROUND OF THE INVENTION

This invention relates to a dynamic combustion characteristic sensor for internal combustion engines and particularly for such a sensor sensitive to combustion pressure induced strains between the block and the head of an internal combustion engine. Such a sensor is useful in generating signals for use in a system to control ignition timing on the basis of the crankshaft-related location (timing) of peak pressure (LPP) and/or on the basis of detected engine knock or detonation.

The prior art includes such dynamic sensors as engine vibration or knock sensors which are physically attached to an engine component in order to sense the vibrations transmitted through the component, engine pressure sensors physically exposed to the combustion chamber to directly measure the pressure therein and quartz force rings mounted on or under spark plugs or under the head of a headbolt. The prior art further includes a variety of static tension indicating bolts which may be accurately tightened to a predetermined preload force or torque. However, if it is desired to produce a sensor primarily for use in an LPP location controlled spark timing system which is also sensitive to engine knock and is inexpensive and easy to manufacuture in large quantities, each of the above-mentioned prior art items has some drawback. For example, direct pressure sensor and spark plug mounted quartz rings must be used one for each combustion chamber. Static tension indicating bolts of prior art construction are awkwardly constructed, expensive and difficult to interface with electric circuitry because of scaling problems.

The sensor of this invention is a modified engine headbolt of the type which holds the engine head to the engine block and is thus subject to the tensions exerted between the block and head by the changing pressures of gases within the combustion chambers. The prior art comprising a quartz force ring or washer compressed under the head of an engine headbolt to sense combustion chamber peak pressure is probably the closest prior art to the sensor of this invention. However, although a quartz ring can make a workable system in a laboratory environment it is not suitable for mass production on vehicles. The item is expensive; and it is separate from the bolt and therefore might be improperly installed. In addition, being under the bolt head, it must bear the full bolt force and must therefore be made quite large so that the head must be machined to create a space for it. Finally, it introduces a spring constant into the headbolt to engine head interface which has been seen to generate low frequency ringing in the peak cylinder pressure signal output which impedes accurate detection of the location of maximum peak pressure.

This invention therefore contemplates modifying the headbolt itself by placing a thin piezoelectric disc on the top surface of the headbolt head and surrounding that element with electrostatic shielding to prevent the contamination of the electrical signal therefrom by capacitive charges or electromagnetic signals generated by the high voltage ignition and other devices present in the engine environment. The resultant sensor is self-contained and inexpensive to produce and is easily installed on an engine in place of an ordinary headbolt. It is used with an output conditioning electrical circuit which rejects low frequency signals generated by thermal stresses between engine block and head. The details and advantages of this invention will be apparent from the accompanying drawings and following description of a preferred embodiment.

SUMMARY OF THE DRAWINGS

FIG. 1 shows a partially cut-away view of a sensor according to this invention.

FIG. 2 shows an accompanying electrical circuit incorporating two of the sensors of FIG. 1 in a 4-cylinder engine application.

FIGS. 3 and 4 show a spark-timing system incorporating the sensor of FIG. 1 to control spark timing on the basis of the location of peak combustion pressure.

DESCRIPTION OF THE PREFERRED EMBODIMENT

Referring to FIG. 1, sensor 10 comprises an engine headbolt made of electrically conducting hardened steel and having a shank 11 with threads 12 at its lower end adapted for cooperation with similar threads in a threaded opening of the engine block of an engine 5, seen in FIG. 3. Sensor 10 further comprises a head 13, at least the lower portion of which is hexagonal in shape to facilitate installation with a standard wrench. Head 13 is radially wider than shank 11 so as to engage with its lower surface 14, a surface of the head of engine 5, the latter surface surrounding an opening in the engine head through which shank 11 projects into the block of engine 5 in the usual manner. Sensor 10, since it is used as a headbolt, is tightened to a predetermined torque to exert a predetermined nominal force between the head and block of engine 5. However, since combustion chambers are also formed between the head and block of engine 5, the changing pressures in thse combustion chambers during the combustion process, in at least the combustion chambers adjacent to sensor 10, cause variations in the aforementioned force which produce flexing in the head 13 of sensor 10.

In order to generate an electrical signal from this flexing, the flat upper surface 15 of head 13 is adapted to receive a thin flat piezoelectric element 16, which may be of the type comprising a thin brass disc bonded to a thin piezoelectric disc. If so formed, the element 16 is mounted with the brass side down; and the upper surface 15 of head 13 may be provided with radially extending grooves and ridges. An epoxy or solder may be used to provide a firm bond between element 16 and head 13 so that the former will share in the flexing of the latter, with the grooves providing an outlet for excess solder or epoxy, while the ridges provide good electrical contact.

A vertical cylindrical wall 18 extends upwardly from head 13 and is provided at its upper end with an outwardly extending flange 19 and an inner shoulder 20. An insulator 21 has a lower disc-shaped portion 22 which engages shoulder 20, a central annular portion 23 and an upper outwardly extending flange 24.

An electrically conducting ground terminal 25 similarly has a lower disc-shaped portion 26 abutting disc portion 22, and an upper annular portion 27 surrounding annular portion 23. The top 28 of annular wall 18 is crimped inwardly to sandwich disc portions 22 and 26 against shoulder 20.

An electrically conducting solid cylindrical terminal member 30 projects through the central annular portion 23 of insulator 21 and extends beyond this portion both upwardly and downwardly. At its lower end, terminal member 30 includes a flange 31 which forms a stabilizing surface and electrical contact for a coil spring 32 provided between flange 31 and piezoelectric element 16. Spring 32 provides electrical contact between the upper surface of the piezoelectric element 16 and the terminal member 30, as well as a stabilizing spring force tending to seat piezoelectric element 16 against the upper surface 15 of sensor head 13. Where terminal member 30 projects upwardly out of flange 24, a flange 33 is provided to prevent terminal member 30 from being pushed downwardly within annular portion 23.

It can be seen from FIG. 1 that extensive electrostatic shielding is provided for sensor 10, such shielding including head 13, vertical annular wall 18 and ground terminal 25. This shielding is continued in a shielded connector 35 having an annular ground terminal 36, which surrounds and contacts terminal 25 of sensor 10. Connector 35 also includes an annular terminal 37 which surrounds and contacts terminal 30 of sensor 10. Terminals 36 and 37 are contained in an insulating cap 38 having a retaining flange 39 at its lower end which engages flange 19 on wall 18 of sensor 10.

As the sensor 10 is subjected to the varying tension between the head and block of engine 5, piezoelectric element 16 is flexed to generate a varying electric voltage signal which is transmitted through spring 32 and washer 31 to terminal 30 for output to circuitry such as that shown in FIG. 2. The electrostatic shielding already described prevents the buildup of excess electric charge on piezoelectric element 16 due to the high voltages and stray capacitive effects present in the environment of engine 5.

FIG. 2 shows appropriate interfacing circuitry to connect one or more sensors such as the sensor 10 into an electronic circuit. Each sensor 10 is connected through a capacitor 40 and resistor 41 to the inverting input of a FET op amp 42, such as the RCA 3140, used as a charge amplifier. Back-to-back diodes 43 and 44 and capacitor 45 are connected between the inverting and non-inverting inputs of op amp 42 to protect it against damage from high voltage or charge present on the piezoelectric element 16 of sensor 10 at the time sensor 10 is connected to the circuit of FIG. 2. The noninverting input of op amp 42 is grounded.

The output of op amp 42 is provided through a resistor 46 to an output junction 47 from which an output may be provided to a location-of-peak-pressure or LPP-controlled spark timing system. Junction 47 is connected through a capacitor 48 in parallel with a resistor 49 and also in parallel with a pair of series resistors 50 and 51, to the inverting input of op amp 42. The junction of resistors 50 and 51 is connected through a capacitor 52 to ground. This combination of feedback elements provides a second order high pass filter with a half power frequency of 0.5 to 1.0 Hertz to reject the low frequency noise due to thermally generated strains in engine 5. A first order filter might be sufficient on some engine locations, but the second order provides an additional margin in case sensor 10 is used in a particularly hot spot. In addition, the input RC combination of capacitor 40 and resistor 41 provide some high-frequency roll-off above 8000 Hertz to reduce noise input, particularly that caused by spark plug firing. In addition, capacitors 40 help in scaling the circuit to the capacitance of the piezoelectric elements and provide isolation between multiple sensors 10 at the input of op amp 42. Finally, junction 47 is connected through series capacitors 53 and 54 to a junction 55 from which an optional knock signal may be obtained. Junction 55 is connected through a resistor 56 to ground, and the junction of capacitors 53 and 54 is connected through a resistor 57 to ground. Elements 53, 54, 56 and 57 comprise a double high pass filter with a cutoff frequency effective to reject the cylinder pressure signal but pass a higher signal above five Kilohertz, in which knock information is present.

Referring to FIG. 3, engine 5 includes air-and-fuel induction apparatus 60, which provides combustible fuel mixture to one or more combustion chambers (not shown). A spark plug 61 is provided for each combustion chamber of engine 5 to ignite the combustible mixture when electrically activated with a high voltage pulse. The high voltage pulses are supplied to spark plugs 61 in the proper sequence through conducting wires 62 from the distributor 63. It is these conducting wires 62, carrying high-voltage signals close to the sensor or sensors 10, which primarily determine the need for electrostatic shielding of the sensors.

The high voltage pulses are generated in the usual manner, beginning with timing pulse generator apparatus 64 which rotates with the engine crankshaft, not shown, and generates regular timing pulses, one for each spark-firing, as described in the U.S. Pat. No. 3,254,247 to Falge issued May 31, 1966. These pulses are provided to a pulse shaper 65 and spark control system 66, in which they are delayed by a predetermined crankshaft angle from the reference timing in order to achieve the optimum spark timing for engine 5. Spark control system 66 receives the output signal from the sensor 10 for use in the closed loop control of spark timing, and further receives marker pulses from a marker-pulse generator 67 comprising a toothed wheel 68, such as the engine flywheel, driven in synchronization with the crankshaft of engine 5, and a pickup 69. The marker pulses from generator 67 may be used to determine engine crankshaft rotational position and rotational speed. From this information, as well as that of sensor 10 and the reference pulses from pulse-shaper 65, the spark control system 66 generates actual spark-timing pulses for spark-pulse generator 70, which generates the high voltage pulses to fire spark plugs 61 at the predetermined times. A basic timing control 71 is an optional open loop control for use when closed loop control is not desired or not possible. Examples of spark timing systems containing circuits useful for pulse shaper 65, basic timing control 71, and spark pulse generator 70 are found in U.S. Pat. No. 3,838,672, issued Oct. 1, 1974, to Richards et al. and West U.S. Pat. No. 4,106,447, issued Aug. 15, 1978.

FIG. 4 shows a more detailed block diagram of spark control system 66. The pulses from pickup 69 are provided to a pulse shaper 75, in which they are shaped in a predetermined manner and provided to a frequency to voltage converter 76. Frequency to voltage converter 76 is a commercially available device which generates a DC voltage which varies with the frequency of the pulses from pulse shaper 75 and thus with the rotational speed of engine 5. This is only one suitable method of generating an engine speed signal; other equivalent ways will be apparent to those skilled in the art of engine control design.

The speed voltage signal from frequency to voltage converter 76 is provided to a ramp generator 77 to control the ramp rate thereof. Ramp generator 77 is triggered by each pulse from pulse shaper 65 so that its output thereafter is an analog of engine crankshaft position as a function of time from the reference position of the triggering pulse. The rising voltage from ramp generator 77 is provided to a sample and hold circuit 78 which is triggered to sample and hold the output of ramp generator 77 at the precise moment of peak combustion chamber pressure. This voltage represents the actual crankshaft rotational position of the peak combustion chamber pressure. It may, therefore, be compared in a summing junction 80, in which it is combined with the desired crankshaft angle of peak combustion pressure to generate an error signal for use in controlling spark timing.

The error signal from summing junction 80 is provided through an operational transconductance amplifier (OTA) 81 to a proportional plus integral feedback control circuit 82 of standard design to vary the timing of spark timing pulses in a spark timing pulse generator from a constant predetermined timing which may be internally stored or provided by basic timing control 71. The variation is such in direction and angle as to reduce the error signal of future generated pulses toward zero. The output of spark timing pulse generator 84 is provided to spark pulse generator 70 to actually generate the spark pulse in the combustion chamber. Other arrangements of the closed loop control will occur to those skilled in the art and may be substituted for that described above.

Operational transconductance amplifier (OTA) 81 is a variable gain device comprising an operational amplifier the actual gain of which is controlled by a current source 85. In this embodiment, current source 85 is a variable current source the current output of which is controlled by the output of frequency to voltage converter 76. Thus, OTA 81 has a gain which varies proportionally with engine speed. Thus, the error signal applied to proportional plus integral controller 82 is proportional to engine speed. This is desirable so that the proportional gain and integration rate track the frequency with which spark events occur.

Sensor 10 provides an output signal to a charge amp 99 comprising the elements of the circuit of FIG. 2 to generate a voltage showing pressure changes within the combustion chamber. This voltage is provided to an AGC element, OTA 86. The output of OTA 86 is provided to a differentiator and filter circuit 87 having a feedback loop containing an OTA 88 controlled by a current source 89 of variable current determined by frequency to voltage converter 76. The output of differentiator and filter circuit 87 is provided to a peak pressure comparator 90 which also has a reference input of zero to detect the derivative zero crossover and therefore the maximum point of the pressure within the combustion chamber. The output of peak pressure comparator 90 signals gate electronics 91 which, if activated, activates sample and hold circuit 78.

Returning to the output of OTA 86, this output is also provided to an averaging peak detector 92 and a window comparator 93. The output of peak detector 92 is provided to an AGC amp 94, the output of which controls the gain of OTA 86 in an AGC loop. This AGC loop is intended to compensate for the varying gains and output levels of different pressure sensors and might not be necessary in a production version with sufficiently strict control over such output levels. The output of peak detector 92, reduced in amplitude by 50 percent, is also provided to window comparator 93 in order to provide an activating window for sample and hold circuit 78 by way of gate electronics 91, whenever the sensed combustion pressure exceeds 50 percent of the previous maximum peak combustion pressure. An additional, optional, window comparator may be included which controls gate electronics 91 to allow actuation of sample and hold circuit 78 in each ramp only between approximately 5 and 35 degrees after top dead center to ignore false peak generating phenomena at top dead center such as piston slap and motoring pressure peak, which latter may be greater at light loads than the combustion pressure peak. Rather than beginning at a constant 5 degrees after top dead center, this window may vary its beginning with one half the average peak pressure. Gate electronics 91 may comprise an AND gate.

Current source 89 applies to OTA 88 a current varying with the signal generated by frequency to voltage converter 76. This current controls the transconductance of OTA 88, which is thus essentially a variable resistor in parallel with a capacitor, not shown, in the feedback loop of differentiator and filter 87 to form a signal smoothing integrating circuit having an integration constant varying with engine speed. A series input capacitor, not shown, for differentiator and filter 87 comprised, with OTA 88, a differentiator having a differentiation constant varying with engine speed. The circuit has a transfer function of the form $RC_1s/(1+RC_2s)$, where R is the equivalent resistance of OTA 88 and $C_1$ and $C_2$ are the capacitances of the input and feedback capacitors, respectively.

The embodiments of the invention in which an exclusive property or privilege is claimed are defined as follows:

1. A dynamic combustion characteristic sensor for an internal combustion engine having a block and a head defining a combustion chamber therebetween and high voltage spark generating apparatus effective to initiate combustion of a combustible charge within said combustion chamber, the sensor comprising, in combination:

a headbolt comprising a theaded shank adapted for engagement with the engine block adjacent the combustion chamber and further comprising a head having a bottom peripheral surface adapted to engage the engine head with a predetermined preload force and a flat upper surface substantially normal to the shank, the head being adapted for engagement with torque generating apparatus for the achievement of said preload force;

a piezoelectric disc affixed to the upper surface of the headbolt so as to partake of flexure of the headbolt head due to combustion related strains between the engine block and engine head;

inner electrical terminal means in electrical contact with one side of the piezoelectric disc so as to provide an output electrical signal therefrom; and outer electrical terminal means in electrical contact with the other side of the piezoelectric disc for a ground connection thereto and forming, with said headbolt head, an electrostatic shield for said piezoelectric disc and inner electrical terminal, whereby an output signal of combustion related characteristics uncontaminated by noise from said high voltage spark generating apparatus is generated by said sensor when engaged with the engine block and head with the predetermined preload force.

2. A dynamic combustion characteristic sensor for an internal combustion engine having a block and a head defining a combustion chamber therebetween and high voltage spark generating apparatus effective to initiate combustion of a combustible charge within said combustion chamber, the sensor comprising, in combination:
- a headbolt comprising a threaded shank adapted for engagement with the engine block adjacent the combustion chamber and further comprising a head having a bottom peripheral surface adapted to engage the engine head with a predetermined preload force and a flat upper surface substantially normal to the shank, the head being adapted for engagement with torque generating apparatus for the achievement of said preload force;
- a piezoelectric disc affixed to the upper surface of the headbolt so as to partake of flexure of the headbolt head due to combustion related strains between the engine block and engine head;
- inner electrical terminal means in electrical contact with one side of the piezoelectric disc so as to provide an output electrical signal therefrom;
- outer electrical terminal means in electrical contact with the other side of the piezoelectric disc for a ground connection thereto and forming, with said headbolt head, an electrostatic shield for said piezoelectric disc and inner electrical terminal; and
- electrical circuit means effective to receive the shielded signal from said inner electrical terminal, said electrical circuit including high pass filter means effective to pass signals having frequency content typical of combustion pressure variations but to block signals having frequency content typical of thermally induced strains in the engine.

3. A dynamic combustion characteristic sensor according to claim 2 in which the half power frequency of the high pass filter means is approximately 0.5 to 1 Hertz.

4. A dynamic combustion characteristic sensor for an internal combustion engine having a block and a head defining a combustion chamber therebetween and high voltage spark generating apparatus effective to initiate combustion of a combustible charge within said combustion chamber, the sensor comprising, in combination:
- a headbolt comprising a threaded shank adapted for engagement with the engine block adjacent the combustion chamber and further comprising a head having a bottom peripheral surface adapted to engage the engine head with a predetermined preload force, a flat upper surface substantially normal to the shank and an annular vertical portion rising from said flat upper surface, the head being adapted for engagement with torque generating apparatus for the achievement of said preload force;
- an insulator member;
- an outer electrical terminal member surrounding said insulator member and engaged, along with said insulator member, around its lower periphery, by said annular vertical wall;
- an inner electrical terminal member projecting through said insulator member and insulated thereby from said outer electrical terminal member, said inner electrical terminal member being electrostatically shielded by said outer electrical terminal member;
- a piezoelectric disc having one side affixed to the upper surface of the headbolt so as to partake of flexure of the headbolt head due to combustion related strains between the engine block and engine head, said one side further being in electrical contact with said upper surface; and
- spring contact means engaging said inner electrical terminal means and said other side of the piezoelectric disc so that electrical signals generated by the latter are provided to the inner electrical terminal means uncontaminated by noise from said high voltage spark generating apparatus when said sensor engages the engine head and block with said predetermined preload force.

* * * * *